Figure 1:
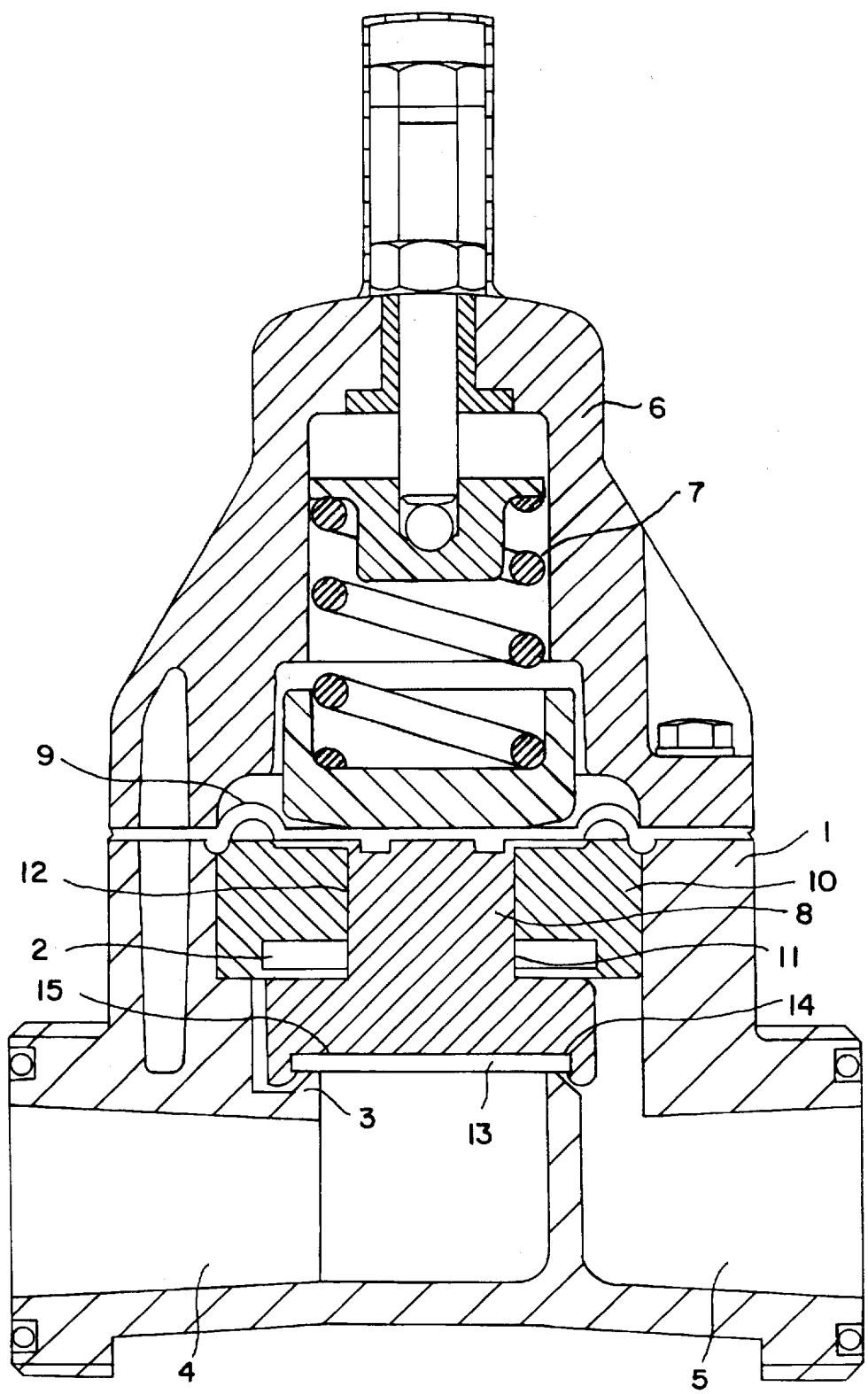

United States Patent [19]
Kohlstädt

[11] Patent Number: 5,725,019
[45] Date of Patent: Mar. 10, 1998

[54] PRESSURE RETAINING VALVE

[75] Inventor: Egon Kohlstädt, Vlotho, Germany

[73] Assignee: ASV Stubbe GmbH & Co. KG, Germany

[21] Appl. No.: 640,924

[22] PCT Filed: May 11, 1995

[86] PCT No.: PCT/EP95/01777

§ 371 Date: May 8, 1996

§ 102(e) Date: May 8, 1996

[87] PCT Pub. No.: WO95/31658

PCT Pub. Date: Nov. 23, 1995

[30] Foreign Application Priority Data

May 13, 1994 [DE] Germany ........................ 9407952 U

[51] Int. Cl.⁶ .................................................. F16K 15/06
[52] U.S. Cl. .................. 137/543.21; 137/543.13; 251/50; 251/335.2
[58] Field of Search ........................... 137/540, 542, 137/543.13, 543.21; 251/335.2, 50

[56] References Cited

U.S. PATENT DOCUMENTS

| | | | |
|---|---|---|---|
| 379,880 | 3/1888 | Taylor | 137/543.13 |
| 966,999 | 8/1910 | Carssow | 137/543.13 |
| 2,859,031 | 11/1958 | Hansen et al. | 137/543.21 |
| 3,393,702 | 7/1968 | Ferrill | 137/543.21 |
| 4,245,667 | 1/1981 | Braukmann | 137/543.13 |

*Primary Examiner*—A. Michael Chambers
*Attorney, Agent, or Firm*—Blakely Sokoloff Taylor & Zafman

[57] ABSTRACT

The invention relates to a pressure retaining valve including a housing which has a housing inlet passage and a housing outlet passage which can be connected to the housing inlet passage, a valve piston which is movable in the housing and has a valve shaft, a valve seat associated with the valve piston, whereby the valve piston is biased by a spring in the direction towards the valve seat and, in the closed position, seals the connection between the housing inlet passage and the housing outlet passage, and an isolating membrane which is clamped in the housing and separates the spring and the valve piston.

5 Claims, 2 Drawing Sheets

5,725,019

PRESSURE RETAINING VALVE

The invention relates to a pressure retaining valve including a housing which has a housing inlet passage and a housing outlet passage which can be connected to the housing inlet passage, a valve piston which is movable in the housing and has a valve shaft, a valve seat associated with the valve piston, whereby the valve piston is biased by a spring in the direction towards the valve seat and, in the closed position, seals the connection between the housing inlet passage and the housing outlet passage, and an isolating membrane which is clamped in the housing and separates the spring and the valve piston.

With pressure retaining valves of the type referred to above one refers to a flow beneath the valve seat which opens the valve piston. In another known type of construction, the housing inlet passage leads into the interior of the housing between the isolating membrane and the upper surface of the valve seat directed towards it, whereby the outlet passage commences at the underside of the valve seat; with this type of construction one refers to a flow beneath the membrane which opens the valve piston. In the case of flow beneath the membrane, so-called control oscillations do not occur as in the pressure retaining valves of the type referred to above but the flow beneath the membrane has the major disadvantage that the entire membrane surface is necessarily acted upon by the entire prevailing system pressure so that enormous spring forces must be applied by the valve spring closing the pressure retaining valve and enormous forces act on the valve seat or the valve seat seal in the event of a pressure reduction in the system down to zero and the isolating membrane constitutes a safety risk and must thus be manufactured with a high manufacturing expense and strong textile reinforcements.

In the pressure retaining valves of the type referred to above, in which flow occurs beneath the valve seat, the high forces do not occur; the isolating membrane needs only to protect the spring dome with its individual components from aggressive media. However, the occurrence of control oscillations in the pressure retaining valves of the type referred to above is disadvantageous. In order to maintain the valve sealed, the spring force is adjusted so that it just overcomes the force which is exerted by the medium on the closed valve piston and which is produced by the product of the pressure of the medium and the exposed area of the housing valve seat. In the event of a pressure rise beneath the valve piston which forces the valve to open, a pressure will be produced due to the internal resistance of the pressure retaining valve to the outlet side of the valve which can be small but which, when the valve piston opens, acts beneath the membrane surface through an internal space in the housing which, due to constructional and manufacturing reasons, extends up from the housing outlet passage to the isolating membrane. The valve piston thus lifts up accordingly. However, since the spring force is sized or adjusted for the relatively small exposed surface of the housing valve seat, a balance between the set spring force and the generated membrane force is not produced so that the valve piston is pressed again in the direction towards the housing valve seat. This up and down movement of the valve piston occurs at rapid intervals; the pressure retaining valve rattles and causes undesired control oscillations.

Pressure retaining valves in which flow occurs beneath the valve seat are known in which complicated special valve piston constructions and valve piston guides with automatically closing and opening bypass passages are used in order to alleviate the problem of the control oscillations. The constructional and functional effort therefor is, however, high and expensive.

The invention therefore has the object of constructing a pressure retaining valve of the type referred to above with simple and economical means so that no control oscillations occur.

The invention solves this object principally by the fact that a guide disc which slidably guides the valve shaft is arranged between the isolating membrane and the valve seat, and that the guide disc surrounds the valve shaft whilst forming a narrow annular gap acting as a throttling point.

There is a connection between the upper side of the housing valve seat and the underside of the isolating membrane via the constructionally determined annular gap. When the valve piston opens, medium can flow in this manner through the annular gap to beneath the isolating membrane. However, if a state of balance between the spring force and membrane force is not reached and the valve piston wants to move in the direction towards the housing valve seat, the medium must also be forced back through the narrow annular gap. The annular gap thereby gives rise to an effective hydraulic damping so that the pressure retaining valve operates surprisingly well and without oscillations, as practical tests have shown.

It has been found that an oscillation-free control performance, which is very satisfactory in practice, may be achieved for most media used in practice with pressure retaining valves if the diameter of the valve shaft is not substantially larger than the valve seat and the annular gap between the valve shaft and the guide disc has a free radial breadth which is at most 0.25 mm. The throttling action and freedom from friction are optimised in this manner.

An advantageous embodiment in accordance with the invention of the pressure retaining valve resides in that at its end directed towards the valve seat the valve piston has a piston collar which is provided with a disc-shaped recess, that the recess has a U-shaped boundary edge and that a sealing plate is inserted loosely in the recess with a small clearance. As a result of the clearance the risk is avoided that a pressure can build up behind the sealing disc which, in the event of a pressure reduction in the pressure retaining valve in front of the sealing plate, could force the latter out of the recess. The sealing plate is thus mounted on the valve piston in a manner which is secured against washing out.

A preferred embodiment of the invention is characterised in that the effective surface of the isolating membrane is substantially of the same size as the surface of the valve seat. The surfaces should preferably differ from one another by at most eight percent. This embodiment has the substantial advantage that the pressure retaining valve is resistant to back pressure. If a back pressure occurs in the housing outlet passage, a first force directed in opposition to the spring force acts on the membrane, the magnitude of which is equal to the product of the effectove area of the isolating membrane and the back pressure. Furthermore, the back pressure exerts on the surface, which is directed towards the isolating membrane, of the valve piston of the size of the valve seat a second force whose magnitude is equal to the first force, due to the same size of the effective area of the isolating membrane and the area of the valve seat, and is directed in opposition to it. These two forces cancel one another out so that even in the event of a back pressure no additional force is exerted on the spring, as would be the case if the effective area of the membrane were larger than the area of the valve seat. The inlet pressure in the pressure retaining valve can be maintained constant in this manner independently of the prevailing back pressure. Further advantageous embodiments are characterised in the dependent claims.

Figure 2:
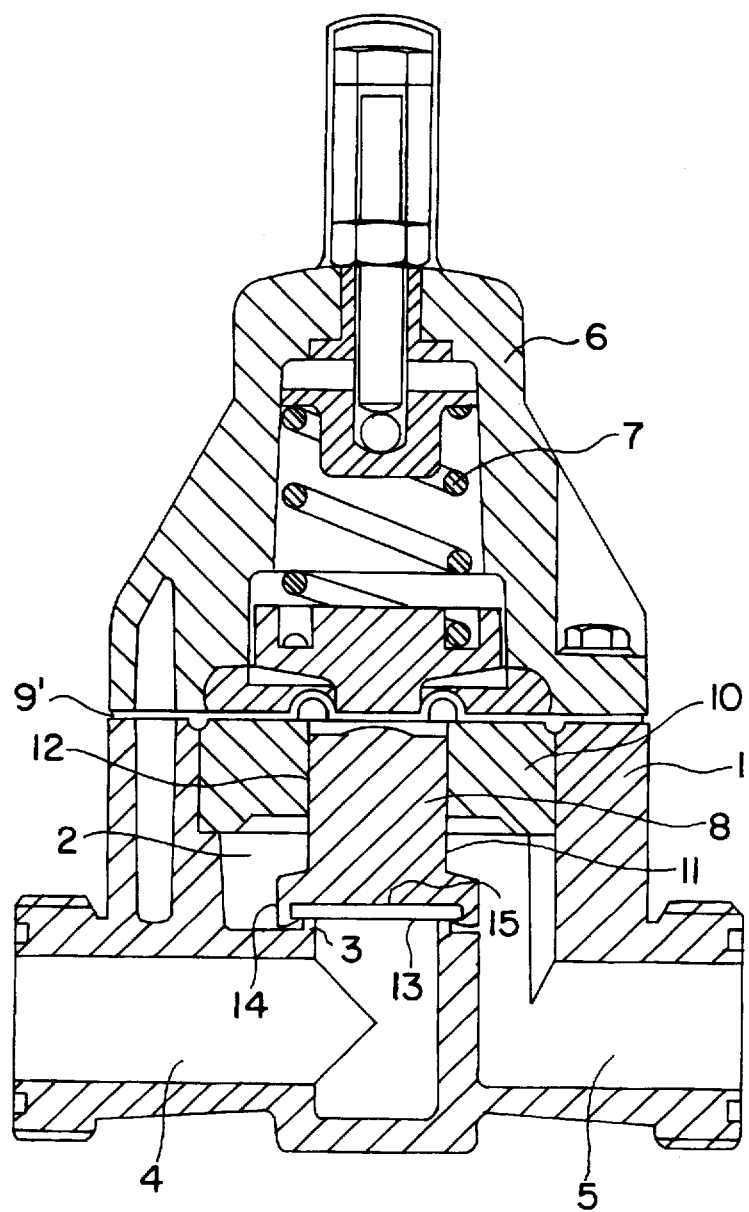

The invention will be explained in more detail below by way of two exemplary embodiments shown in the drawings, in which:

FIG. 1 is a schematic axial sectional view of a first exemplary embodiment of the pressure retaining valve in accordance with the invention and FIG. 2 is a similar view of a second exemplary embodiment of the pressure retaining valve in accordance with the invention.

As shown in FIG. 1, a valve housing 1 includes a valve housing space 2 with a housing valve seat 3. Leading to the underside of the valve seat 3 is a housing inlet passage 4. Commencing at the upper side of the valve seat 3 is a housing outlet passage 5. The pressure retaining valve further has a spring dome 6 with a compression spring 7 which presses a valve piston 8 against the valve seat 3 with its adjustable spring force. Sealingly clamped between the housing 1 and the spring dome 6 is an isolating membrane 9 which separates the valve housing space 2 and the valve piston 8 from the spring dome 6 and the compression spring 7.

Arranged in the valve housing space 2 above the valve seat 3 is a guide disc 10 which slidably guides the valve piston 8 and surrounds its cylindrical valve shaft 11 such that it defines a narrow annular gap 12 together with the guide shaft extending over the entire periphery of the shaft. The guide disc 10 covers the underside of the isolating membrane 9, with the exception of this narrow annular gap 12, in a sealed manner with respect to the upper surface of the valve seat 3 connected to the housing outlet passage 5 so that medium can only flow to the underside of the isolating membrane 9 through the narrow hydraulic clearance of the annular gap 12. The radial breadth of the annular gap 12 is so small that the medium can only flow through the annular gap 12 with a flow which is strongly decelerated and effectively damped by throttling, depending on its viscosity. The desired oscillation-free control performance without rattling of the pressure retaining valve is achieved by this simple constructional feature alone. This object can be achieved in most cases occurring in practice in which pressure retaining valves are used if the free radial breadth of the annular gap 12 between the valve shaft 11 and the guide disc 10 is at most 0.25 mm, regardless of what size the valve piston has in dependence on the nominal breadth of the pressure retaining valve.

The valve shaft 11 has a diameter which substantially corresponds to the diameter of the valve seat opening 3. At its end directed towards the valve seat 3 the valve shaft 11 has a piston collar 14 whose diameter is greater than the valve seat opening 3. The piston collar 14 includes a disc-shaped recess 15 in which a sealing plate 13, which covers the valve seat opening 3, is loosely inserted. The boundary edge of the recess 15 is of approximately U-shape and embraces the peripheral edge of the sealing plate 13 not in a clearance-free and sealed manner but with a small movability clearance. As a result of this clearance medium which has flowed behind the sealing plate can escape again unimpeded to the front side of the sealing plate. A mounting of the sealing plate 13 in the disc-shaped recess 15 which is secure against washing out is thus achieved in this manner.

The pressure retaining valve in accordance with FIG. 2 differs from the pressure retaining valve in accordance with FIG. 1 only in that the isolating membrane 9' has a smaller effective area than the isolating membrane 9 in FIG. 1. The isolating membrane 9' is so clamped that its effective area is of the same size as the area of the valve seat 3. A counter pressure possibly present in the housing outlet passage 5 does not impair the function of the pressure retaining valve in this manner. The force exerted on the isolating membrane by the back pressure, the magnitude of which is equal to the product of the effective area of the isolating membrane and the back pressure, is thus equal to the oppositely directed force exerted on the valve piston. The valve is back pressure resistant in this embodiment and thus operates with very high accuracy.

Numerous variations are possible within the scope of the inventive concept. The valve shaft and the associated annular gap can e.g. have any desired diameter depending on the size of the valve.

I claim:

1. Pressure retaining valve comprising:

a housing which has a housing inlet passage, a housing outlet passage and a connecting passage in between, a valve piston which is movable in the housing and has a valve shaft, a valve seat being associated with the valve piston, the valve piston being biased by a spring in the direction towards the valve seat and, in the closed position, sealing the connecting passage between the housing inlet passage and the housing outlet passage, an isolating membrane which is clamped in the housing and separates the spring and the valve piston, a guide disc arranged between the isolating membrane and the valve seat, the guide disc surrounding and slidably guiding the valve shaft, and the guide disc and the valve shaft forming a narrow annular gap acting as a throttling point.

2. Pressure retaining valve as claimed in claim 1, wherein the diameter of the valve shaft is not substantially larger than the valve seat and the breadth of the annular gap between the valve shaft and guide disc is at most 0.25 mm.

3. Pressure retaining valve as claimed in claim 1, wherein at its end directed towards the valve seat the valve piston has a piston collar which is provided with a disc-shaped recess, the recess having a U-shaped boundary edge and a sealing plate loosely inserted with a small clearance into the recess.

4. Pressure retaining valve as claimed in claim 1, wherein the housing comprises two portions, one of the housing portions being associated with the spring and constructed as a spring dome and the isolating membrane being clamped between the two housing portions.

5. Pressure retaining valve as claimed in claim 1, wherein the isolating membrane has an effective area of substantially the same size as the area of the valve seat.

* * * * *